US008832004B2

(12) United States Patent
Kato et al.

(10) Patent No.: US 8,832,004 B2
(45) Date of Patent: Sep. 9, 2014

(54) CONVOLUTION OPERATION CIRCUIT AND OBJECT RECOGNITION APPARATUS

(75) Inventors: Masami Kato, Sagamihara (JP);
Takahisa Yamamoto, Kawasaki (JP);
Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 689 days.

(21) Appl. No.: 13/132,316

(22) PCT Filed: Dec. 3, 2009

(86) PCT No.: PCT/JP2009/070626
§ 371 (c)(1),
(2), (4) Date: Jun. 1, 2011

(87) PCT Pub. No.: WO2010/064728
PCT Pub. Date: Jun. 10, 2010

(65) Prior Publication Data
US 2011/0239032 A1     Sep. 29, 2011

(30) Foreign Application Priority Data

Dec. 4, 2008  (JP) ................. 2008-309970

(51) Int. Cl.
*G06N 3/063*   (2006.01)
*G06F 17/15*   (2006.01)
(52) U.S. Cl.
CPC ............ *G06N 3/063* (2013.01); *G06F 17/15* (2013.01)
USPC .................. 706/12; 706/15; 706/45
(58) Field of Classification Search
None
See application file for complete search history.

(56) References Cited

U.S. PATENT DOCUMENTS

| | | |
|---|---|---|
| 4,989,158 A | 1/1991 | Sloane |
| 4,991,107 A | 2/1991 | Sloane |
| 5,619,579 A | 4/1997 | Ando et al. |
| 6,038,337 A | 3/2000 | Lawrence et al. |

FOREIGN PATENT DOCUMENTS

| | | |
|---|---|---|
| EP | 373943 A2 | 6/1990 |
| JP | 62-137668 A | 6/1987 |
| JP | 2-290527 A | 11/1990 |
| JP | 03-156460 A | 7/1991 |
| JP | 5-150781 A | 6/1993 |

(Continued)

OTHER PUBLICATIONS

Nekkalapu, Final Report on Image Matching Processor on Xilinx FPGA, As Part of Project Work for ECE 573, ECE Department, Portland State University, 2007, pp. 1-54.*

*Primary Examiner* — Wilbert L Starks
(74) *Attorney, Agent, or Firm* — Canon U.S.A., Inc. IP division

(57) ABSTRACT

In a convolution operation circuit, a first and a second shift registers provide data to a first and a second inputs of a plurality of multipliers, a first and a second storage units store data to be supplied to the first and the second shift registers, a plurality of cumulative adders accumulate output from the plurality of multipliers, a third storage unit latches output from the plurality of cumulative adders at predetermined timing, a fourth storage unit stores data to be stored in the first and the second storage units and data output from the third storage unit, and a control unit sets data stored in the first and the second storage units to the first and the second shift registers at predetermined timing, causes the first and the second shift registers to perform shift operations in synchronization with an operation of the cumulative adder.

22 Claims, 15 Drawing Sheets

(56) References Cited

FOREIGN PATENT DOCUMENTS

| | | |
|---|---|---|
| JP | 6-175691 A | 6/1994 |
| JP | 07-199979 A | 8/1995 |
| JP | 10-021406 A | 1/1998 |
| JP | 10-162120 A | 6/1998 |
| JP | 2-236659 A | 9/1999 |
| JP | 2004-128975 A | 4/2004 |

* cited by examiner

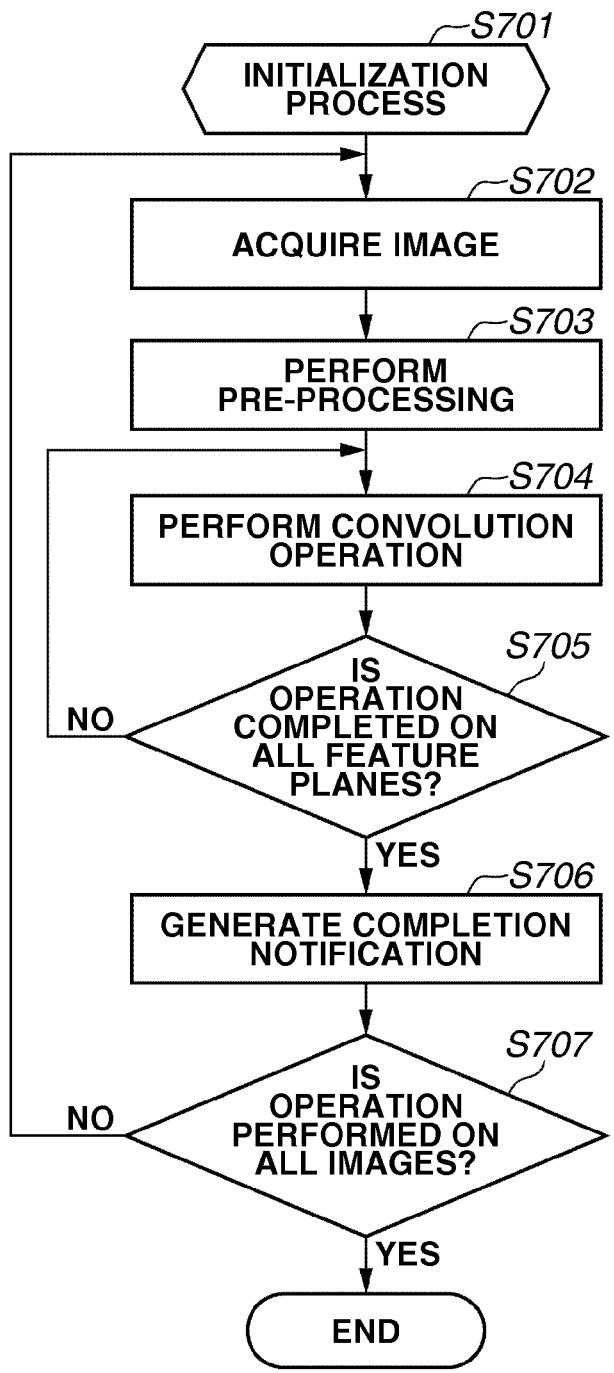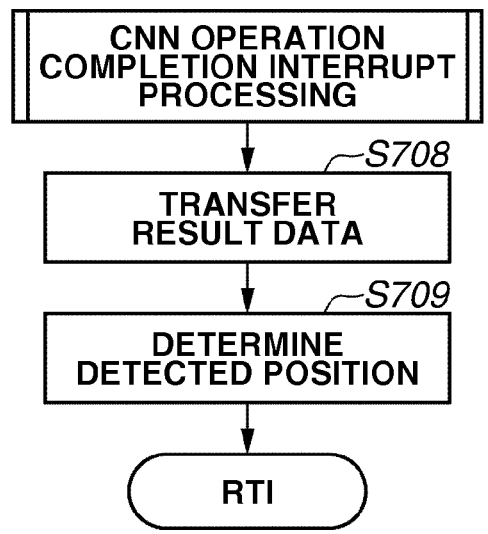

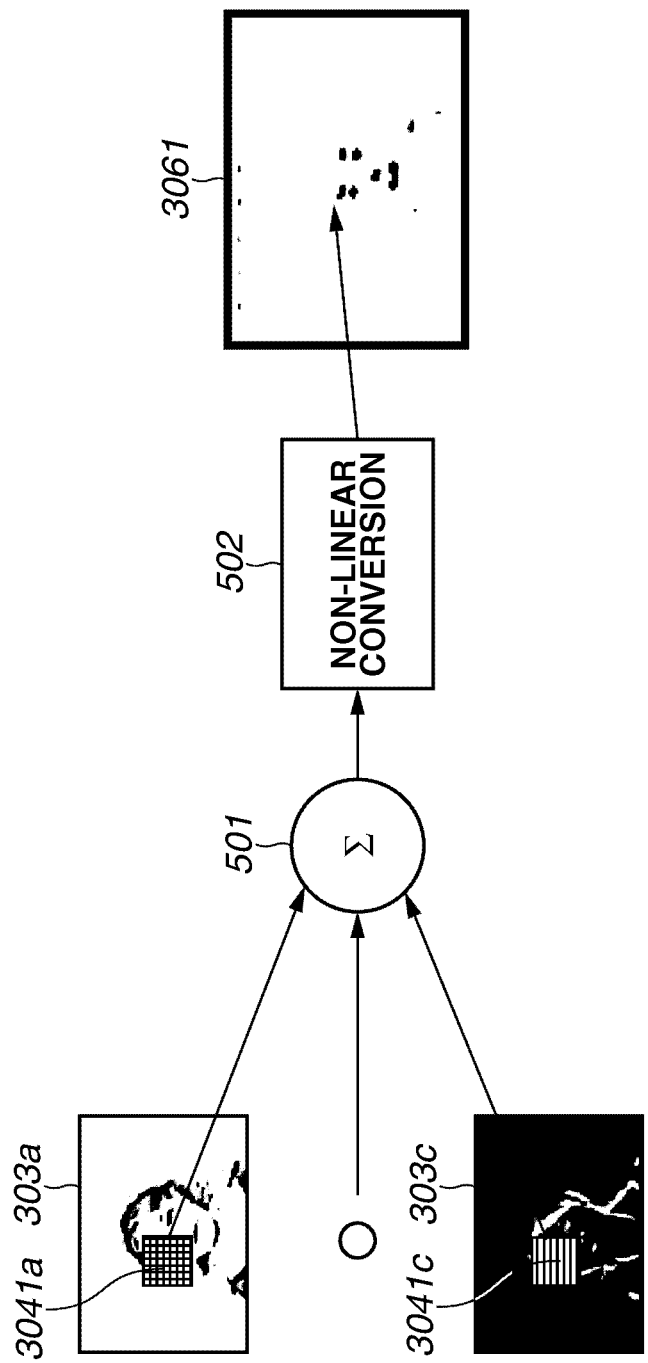

CONVOLUTION OPERATION CIRCUIT AND OBJECT RECOGNITION APPARATUS

TECHNICAL FIELD

The present invention relates to convolution operation circuit and object recognition apparatus using thereon.

BACKGROUND ART

A signal processing apparatus which employs a neural network is widely used in pattern recognition apparatus, prediction system, and control apparatus. Generally, the neural network is realized by software which runs on a microprocessor and is provided to a personal computer or a work station as application software. On the other hand, there is a technique which realizes the neural network by analog hardware or digital hardware to be applied to a high-speed processing apparatus which processes large scale data such as image data. For example, Japanese Patent Application Laid-Open No. 2-236659 discusses a technique which realizes a general multi-layer perceptron neural network by digital hardware.

Among the neural networks, an operation method referred to as a convolutional neural network (hereinafter referred to as CNN) realizes pattern recognition which is robust against changes in recognition targets. Japanese Patent Application Laid-Open No. 10-021406 discusses a technique for performing face recognition using image data by applying such a method.

An example of the CNN operation will be described below. FIG. 13 illustrates a network configuration of an example of the CNN operation. Referring to FIG. 13, an input layer 301 is the image data of a predetermined size which is raster-scanned when performing the CNN operation on the image data. Feature planes 303a, 303b, and 303c are feature planes of a first layer 308. The feature plane is a data plane which indicates a detection result of a predetermined feature extraction filter (which performs the convolution operation and non-linear processing). For example, when face detection is performed, the feature plane is the data plane indicating the detection results of eyes, a mouth, and a nose.

Since the feature plane is the detection result of the raster-scanned image data, the detection result is also expressed as a plane. The feature planes 303a, 303b, and 303c are generated by performing the convolution operation and the non-linear processing on the input layer 301. For example, the feature plane 303a is acquired by performing the convolution filtering operation on a filter kernel 3021a and performing the non-linear transformation on the operation result. Further, filter kernels 3021b and 3021c are each used to generate the feature planes 303b and 303c respectively.

FIG. 10 illustrates an example of the convolution filter. Referring to FIG. 10, data 41 indicates a raster-scanned reference pixel, and a filter kernel 42 is an example of the filter kernel with respect to the reference pixel. The example illustrated in FIG. 10 is equivalent to performing a finite impulse response (FIR) filter operation in which the kernel size is 11 by 11. The FIR filter is processed by a product-sum operation illustrated below.

$$\text{output}(x, y) =$$

-continued $$\sum_{row=0}^{rowSize} \sum_{column=0}^{columnSize} \text{input}(x + \text{column}, y + \text{row}) \times \text{weight}(\text{column}, \text{row})$$

In the above equation, "input (x, y)" indicates a reference pixel value in an x-y coordinate and "output (x, y)" indicates the FIR filter operation result in the x-y coordinate. Further, "weight (column, row)" indicates an FIR filter coefficient in a coordinate (x+column, y+row), and "columnSize" and "rowSize" indicate a filter kernel size.

When the feature plane 303a illustrated in FIG. 13 is to be calculated, the data matrix 41 corresponds to the input layer 301, and the filter kernel 42 corresponds to the filter kernel 3021a. In the CNN operation, the product-sum operation is repeated while the filter kernel is scanned pixel by pixel, and the feature plane is generated by performing the non-linear conversion on the final product-sum result. Further, since the number of connections with the previous layer is one, one filter kernel is used in calculating the feature plane 303a.

The operation for generating a feature plane 305a of a second layer 309 illustrated in FIG. 13 will be described below. FIG. 15 illustrates the operation for generating the feature plane 305a. Referring to FIG. 13, the feature plane 305a is connected with the feature planes 303a, 303b, and 303c of the previous first layer 308. A filter operation is thus performed on the feature plane 303a to calculate the data of the feature plane 305a by using the kernel which is schematically illustrated as the filter kernel 3041a. The result is then stored in a cumulative adder 501.

The filter operations using the filter kernels 3042a and 3043a are similarly performed on the feature planes 303b and 303c respectively, and the results are accumulated in the cumulative adder 501. After the three types of the filter operations are completed, a non-linear conversion 502 is performed using a logistic function or a hyperbolic arctangent function (tan h function). The feature plane 305a is thus generated as a result of performing the above-described process by scanning the entire image pixel by pixel.

Similarly, three convolution filter operations are performed on the feature planes 303a, 303b, and 303c of the previous first layer 308 using the filter kernels 3041b, 3042b, and 3043b respectively to generate the feature plane 305b. Further, two convolution filter operations are performed on the feature planes 305a and 305b of the previous second layer 309 using the filter kernels 3061 and 3062 to generate a feature plane 307 of a third layer 310.

Each filter coefficient is determined in advance by learning using a general method such as perceptron learning or back propagation learning. A large size filter kernel whose size is 10 by 10 or larger is often used in the object detection and recognition.

As described above, since a plurality of filters having a large kernel size is hierarchically used in the CNN operation, it is necessary to perform a great number of convolution operations. Therefore, if the CNN operation is to be implemented by software, expensive high-end processors become necessary.

Further, if the CNN operation is to be implemented by hardware, an apparatus of sufficient performance cannot be realized by a serial process circuit formed of one operation unit as discussed in Japanese Patent Application Laid-Open No. 2-236659. Japanese Patent Application Laid-Open No. 2-236659 also discusses a method for realizing high-speed processing by combining a plurality of serial processing circuits. However, it is difficult to realize high-performance hardware which adapts to arbitrary networks by employing the same circuit. Further, Japanese Patent Application Laid-Open No. 2-236659 discusses a configuration of a plurality of product-sum operation units. Since different weight coefficients are applied to each of the product-sum operation units which operate concurrently, the circuit size increases when implementing high speed convolution operation such as the CNN operation using a plurality of large-size kernels.

Furthermore, Japanese Patent Application Laid-Open No. 2004-128975 discusses an image processing apparatus which performs a high-speed parallel convolution operation by setting common weight coefficients to the product-sum operation units and extracting the input data in parallel while shifting the input data. The circuit included in the image processing apparatus uses a multiport memory in which the number of ports is equivalent to that of computing units. Therefore, if the image processing apparatus is applied to a general single port memory system, the inputting of the data may become a bottle neck, and performance which is appropriate to the degree of parallelism of the computing units cannot be achieved.

Moreover, a plurality of weight coefficients of a large filter kernel size may be employed in the CNN operation, and the process may be performed by selecting the plurality of weight coefficients for each product-sum operation. In such a case, the setting of the weight coefficients may become a bottle neck, and performance which is appropriate to the degree of parallelism cannot be acquired.

The above-described conventional techniques are originally directed at realizing a general multi-layer perceptron neural network or a general FIR filter. Therefore, it is difficult to perform a complex and hierarchical convolution operation such as the CNN operation by a simple and flexible configuration.

Patent Citation 1

Japanese Patent Application Laid-Open No. 2-236659

Patent Citation 2

Japanese Patent Application Laid-Open No. 10-021406

Patent Citation 3

Japanese Patent Application Laid-Open No. 2004-128975

DISCLOSURE OF INVENTION

The present invention is directed to a convolution operation circuit which can perform a high speed convolution operation by a simple configuration.

According to an aspect of the present invention, a convolution operation circuit includes a plurality of multipliers, a first shift register configured to provide data to a first input of the plurality of multipliers, a first storage unit configured to store a plurality of data to be supplied to the first shift register, a second shift register configured to provide data to a second input of the plurality of multipliers, a second storage unit configured to store a plurality of data to be supplied to the second shift register, a plurality of cumulative adders configured to accumulate output from the plurality of multipliers, a third storage unit configured to latch output from the plurality of cumulative adders at predetermined timing, a fourth storage unit configured to store data to be stored in the first storage unit and the second storage unit and data output from the third storage unit, and a control unit configured to control operations of the first storage unit, the second storage unit, the third storage unit, the fourth storage unit, the first shift register, the second register, and the cumulative adder, wherein the control unit sets a plurality of data stored in the first storage unit to the first shift register at predetermined timing, sets a plurality of data stored in the second storage unit to the second shift register at predetermined timing, causes the first shift register and the second shift register to perform shift operations in synchronization with an operation of the cumulative adder, and transfers during the shift operation data stored in the fourth storage unit to at least one of the first storage unit and the second storage unit.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIGS. 9A and 9B illustrate flowcharts of an operation of the object detection apparatus according to the first exemplary embodiment of the present invention.

FIG. 15 illustrates an operation for generating the feature plane.

DESCRIPTION OF EMBODIMENTS

Various exemplary embodiments, features, and aspects of the invention will be described in detail below with reference to the drawings.

Figure 1:
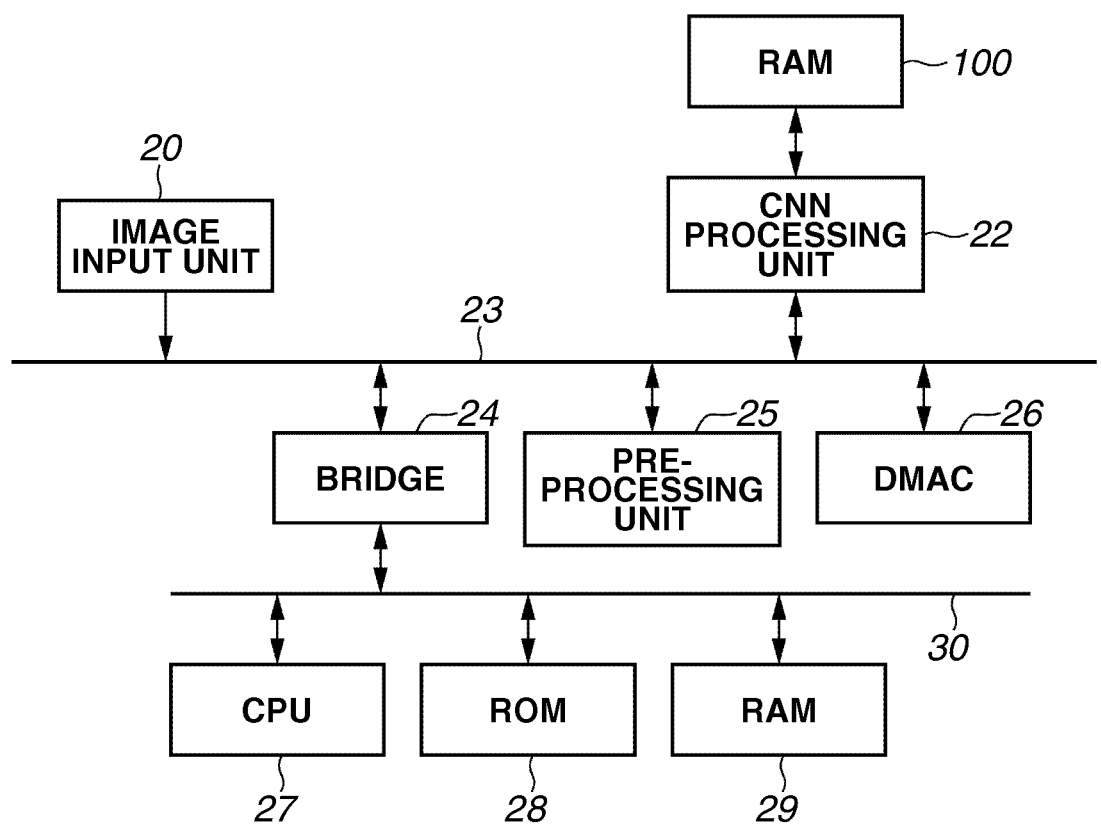
FIG. 1 illustrates a block diagram of a configuration of an object detection apparatus according to a first exemplary embodiment of the present invention.

FIG. 1 illustrates a configuration of the object detection apparatus including a hierarchical convolution operation circuit according to the first exemplary embodiment of the present invention. The object detection apparatus includes a function for performing a two-dimensional convolution operation and detecting a specific object from the image data.

Referring to FIG. 1, the object detection apparatus includes an image input unit 20, a CNN processing unit 22, a bridge 24, a pre-processing unit 25, a direct memory access controller (DMAC) 26, and a RAM 100. Further, the object detection apparatus includes a central processing unit (CPU) 27, a read-only memory (ROM) 28, and a RAM 29. The image input unit 20, the CNN processing unit 22, the pre-processing unit 25, and the DMAC 26 are connected to each other via an image bus 23. The CPU 27, the ROM 28, and the RAM 29 are connected to each other via a CPU bus 30. Furthermore, the bridge 24 allows data transfer between the image bus 23 and the CPU bus 30.

The image input unit 20 includes an optical system and a photoelectric conversion device such as a charge-coupled device (CCD) or a complementary metal oxide semiconductor (CMOS). Further, the image input unit 20 includes a driver circuit which controls the sensor, an analog-digital (AD) converter, a signal processing circuit which performs various image corrections, and a frame buffer.

The CNN processing unit 22 functions as the hierarchical convolution operation circuit. The RAM 100 is used as a work buffer of the CNN processing unit 22. The CNN processing unit 22 will be described in detail below with reference to FIG. 2.

The pre-processing unit 25 performs various pre-processing for efficiently performing the detection process based on the CNN operation. For example, the pre-processing unit 25 performs image data conversion such as color conversion and contrast correction by hardware.

The DMAC 26 performs data transfer between the image input unit 20, the CNN processing unit 22, and the pre-processing unit 25 on the image bus 23 and the CPU bus 30.

The ROM 28 stores instructions and parameter data for controlling the operations of the CPU 27. The CPU 27 reads the instructions and the parameter data stored thereon and controls the entire operations of the object detection apparatus. The RAM 29 is used as the work area of the CPU 27. The CPU 27 can also access the RAM 100 on the image bus 23 via the bridge 24.

Figure 2:
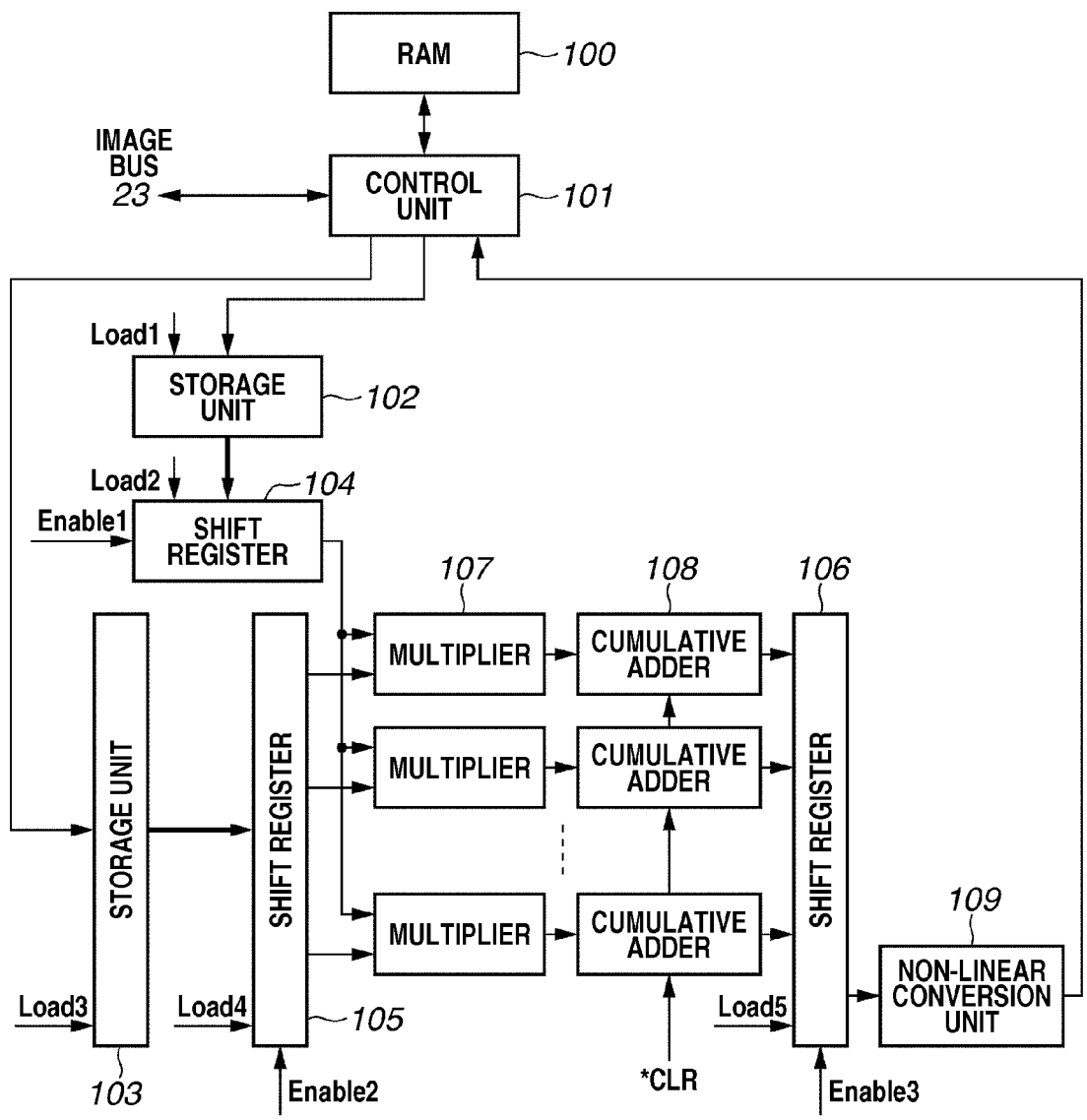
FIG. 2 illustrates a block diagram of a configuration of a CNN processing unit.

The CNN processing unit 22 will be described in detail below. FIG. 2 illustrates a block diagram of the configuration of the CNN processing unit 22. As described above, the CNN processing unit 22 functions as the hierarchical convolution operation circuit. In the present exemplary embodiment, the CNN processing unit 22 performs parallel processing in a column direction of the filter kernel.

Referring to FIG. 2, the CNN processing unit 22 includes a control unit 101, storage units 102 and 103, shift registers 104, 105, and 106, a plurality of multipliers 107 each having two inputs, a plurality of cumulative adders 108, and a non-linear conversion unit 109.

The control unit 101 includes a register group which determines the basic operation of the CNN processing unit 22 itself, a sequencer which controls timing of various signals based on register values set to the register group, and a memory control unit which performs access arbitration to the RAM 100. The control unit 101 will be described in detail below with reference to FIG. 3.

The storage unit 102 temporarily stores the weight coefficient data stored in the RAM 100. If the weight coefficient data is expressed in 8 bits, the storage unit 102 is configured by a plurality of registers of 8 bit width. Further, the storage unit 102 includes a number of registers (i.e., storage capacity) whose size is greater than or equal to the size of the filter kernel in the same direction as the direction in which parallel processing is performed. For example, if the filter kernel size in the column direction is 11, at least 11 registers become necessary. More specifically, it is desirable that the number of registers is equivalent to the assumable maximum filter size.

The storage unit 103 temporarily stores the reference data stored in the RAM 100. If the reference data is expressed in 8 bit, the storage unit 103 is configured by a plurality of registers of 8 bit width. Further, the storage unit 103 includes a number of registers (i.e., storage capacity) which is greater than or equal to a sum of "a number of data to be parallel-processed (i.e., register length)" and "a filter kernel size in the same direction as the direction of performing parallel processing −1".

The number of registers is a value which is necessary for acquiring the data referred to by the feature plane data of positions to be collectively processed (i.e., to be parallel-processed). A number of registers which is greater than or equal to such a value is thus required. For example, if the filter kernel size in the column direction is 12 and the degree of parallelism of the operation is 12, at least 23 8-bit registers become necessary.

The shift registers 104, 105, and 106 include a data load function. For example, the shift registers 104 and 105 are each configured of a plurality of registers whose bit width is the same as the storage units 102 and 103. The shift register 106 is configured of a plurality of registers whose number of bit is greater than or equal to a significant bit of the output from the cumulative adder 108.

Figure 3:
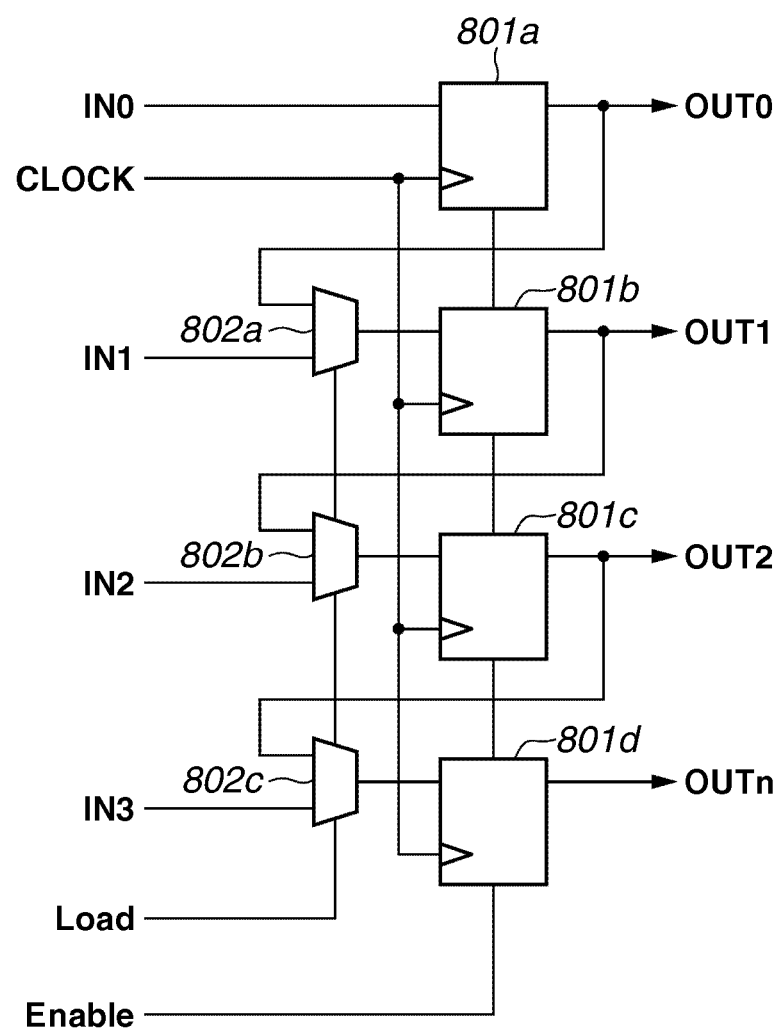
FIG. 3 is illustrates a configuration of a shift register.

FIG. 3 illustrates an example of the configuration of the shift registers 104, 105, and 106. Referring to FIG. 3, the shift register is configured of four registers. More specifically, the shift register is configured of four multi-bit flip-flops 801a, 801b, 801c, and 801d which latch data of a predetermined bit in synchronization with a clock signal. When an Enable signal applied to the flip-flops 801a, 801b, 801c, and 801d is 1, the flip-flops 801a, 801b, 801c, and 801d latch data at a rising edge of the clock signal. On the other hand, if the enable signal is 0, the data latched at the previous clock is kept stored, so that there is no status transition. Further, the shift register includes three selectors 802a, 802b, and 802c which selects a signal OUTx (x: 0, 1, and 2) when a selection signal (Load signal) is 0 and a signal INx (x: 1, 2, and 3) when the selection signal is 1. The selectors 802a, 802b, and 802c thus select the shift operation or the load operation according to the Load signal.

Load2 signal, Load4 signal, and Load5 signal illustrated in FIG. 2 correspond to the Load signal illustrated in FIG. 3, and Enable1 signal, Enable2 signal, and Enable3 signal illustrated in FIG. 2 correspond to the Enable signal illustrated in FIG. 3. Such a configuration can thus realize a high-speed circuit in which an increase in wiring and delay due to a complexity of the selector is small even when the degree of parallelism is high.

During the shift operation of the shift register 104, the control unit 101 loads from the RAM 100 the coefficients which are necessary for performing the product-sum operation of the next column. Further, during the shift operation of the shift register 105, the control unit 101 loads from the RAM 100 the reference data which is necessary for processing the next column. After loading the initial data (i.e., collectively loading from the storage unit 102), the shift register 104 performs the shift operations by a same number of clocks as the filter kernel size in the column direction. The shift register 104 then continuously supplies the weight coefficient data to the multipliers 107. In other words, the signal OUTn (i.e., a final layer output of the shift register) illustrated in FIG. 3 is supplied to all multipliers 107.

Furthermore, when the initial data is loaded from the storage unit 103 to the shift register 105, the shift register 105 performs the shift operations by a number of clocks equivalent to the filter kernel size in the column direction. The shift register 105 then concurrently supplies a plurality of reference data to the multipliers 107. More specifically, the signals OUT1 to OUTn illustrated in FIG. 3 are concurrently supplied to all multipliers 107. The shift register 104 and the shift register 105 operate in synchronization with each other. By performing the above-described process, the product-sum operations and loading of the data from the RAM 100 can be pipelined by the column of the filter kernel.

Figure 4:
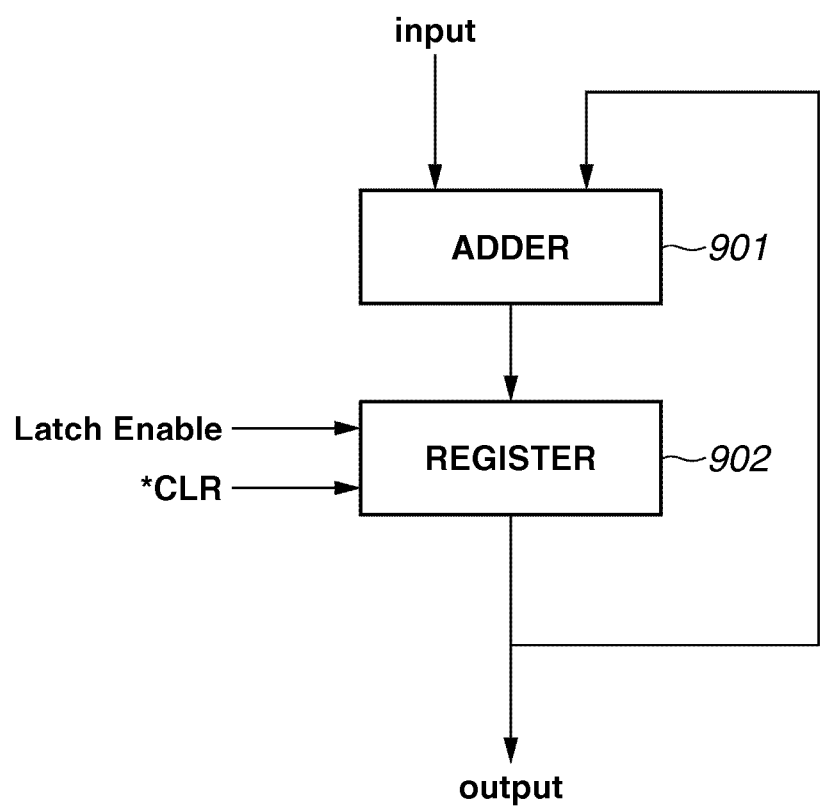
FIG. 4 illustrates a configuration of a cumulative adder.

FIG. 4 illustrates a configuration of the cumulative adder 108. Referring to FIG. 4, the cumulative adder 108 which includes an adder 901 and a register 902 stores a cumulative sum of the input data according to a Latch Enable signal. The Latch Enable signal is in synchronization with the clock signal. The cumulative sum acquired by the cumulative adder 108 is loaded to the shift register 106 after completing the operation of all filter kernels that correspond to the target feature plane. The cumulative sum is then transmitted to the non-linear conversion unit 109 at predetermined timing. For example, 12 identical multipliers 107 and 12 identical cumulative adders 108 each operating according to the same clock are disposed side by side. Further, the shift register 106 includes flip-flops that can store the outputs from the 12 cumulative adders 108. Only a predetermined significant bit of the output from the cumulative adder 108 is output to the shift register 106.

Figure 5:
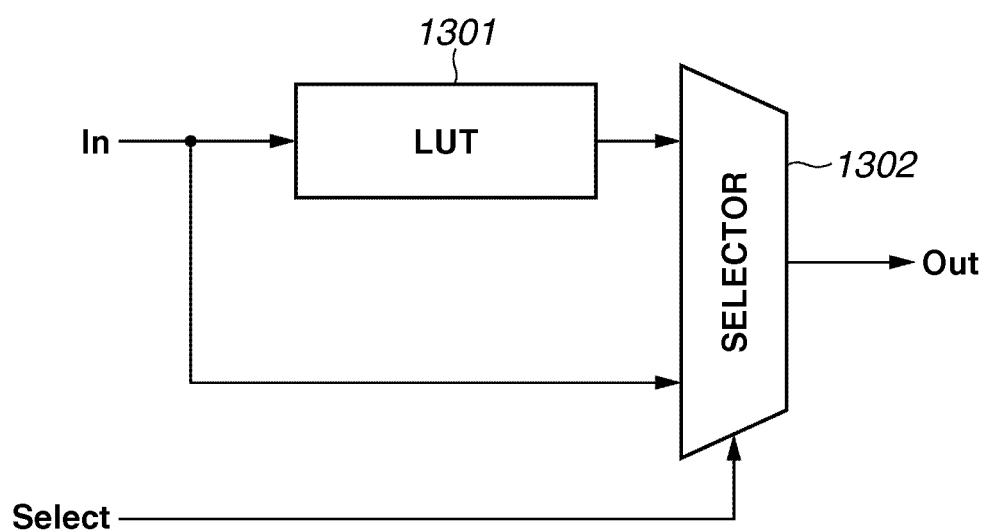
FIG. 5 illustrates a configuration of a non-linear conversion unit.

FIG. 5 illustrates a configuration of the non-linear conversion unit 109. The non-linear conversion unit 109 includes a look up table (LUT) 1301 and a selector 1302. The LUT 1301 refers to the data stored in the ROM by using the product-sum result as address data (In). The ROM previously records the non-linear relation of the outputs corresponding to address values. If the non-linear conversion is not to be performed, the selector 1302 directly outputs the product-sum operation result (Out). The control unit 101 supplies the selection signal (Select) to the selector 1302. In other words, the selector 1302 is controlled according to a value of a "non-linear conversion" register inside the control unit 101 (to be described below).

Register sets 1101a, 1101b, and 1101c (illustrated in FIG. 7 to be described below) including the "non-linear conversion" registers are configured for each feature plane, so that whether to perform the non-linear conversion can be selected by each feature plane. Since whether or not the non-linear conversion is to be performed can be selected for each feature plane, as a result, a large scale network including a mixture of layers can be configured. Further, the data acquired from the non-linear conversion unit 109 is stored in a predetermined address of the RAM 100. Such a storing address is also controlled according to a setting of a register group 602 and an operation of a sequence control unit 601 (refer to FIG. 6) of the control unit 101.

Figure 6:
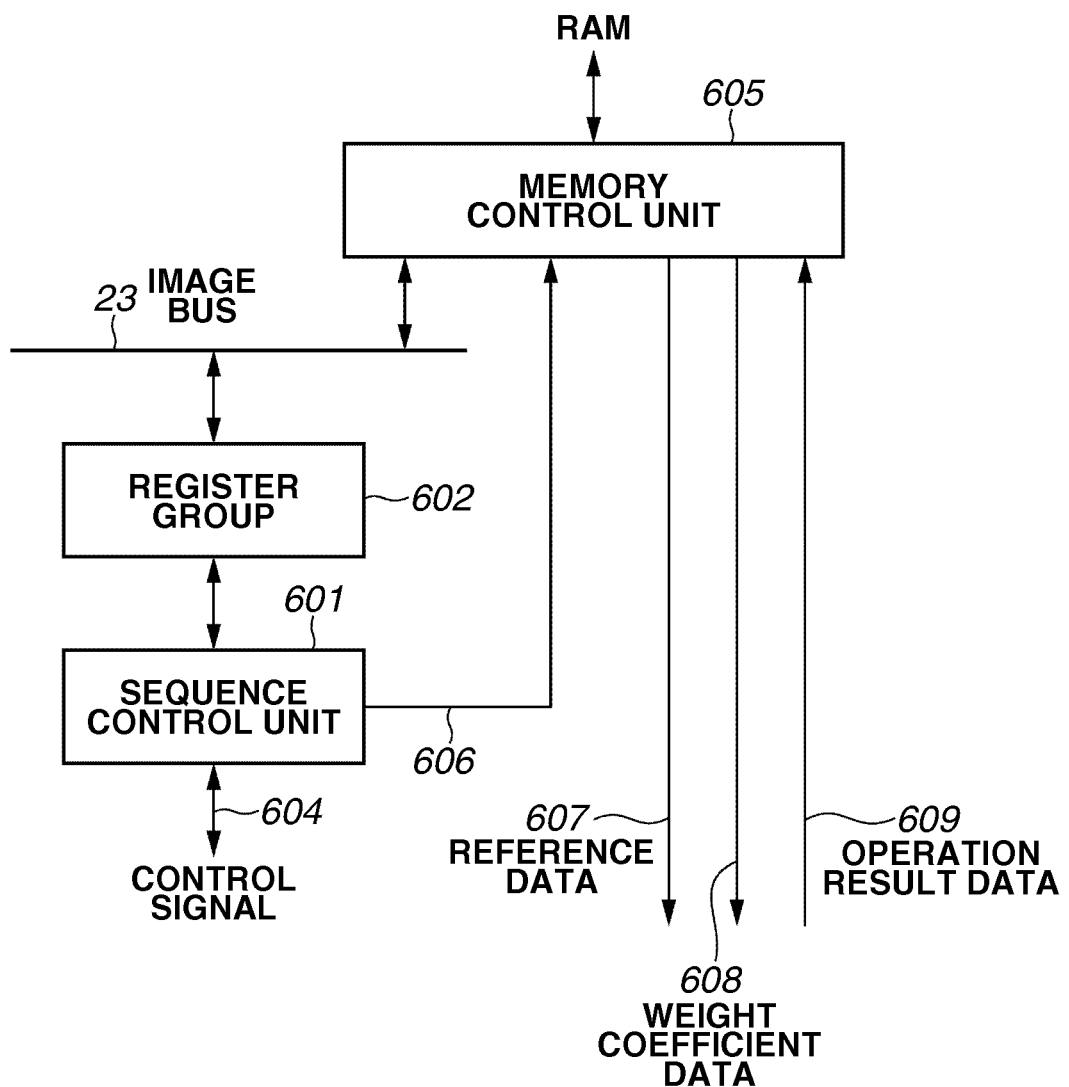
FIG. 6 illustrates a block diagram of a configuration of a control unit.

The control unit 101 will be described in detail below. FIG. 6 illustrates a block diagram of the configuration of the control unit 101.

Referring to FIG. 6, the control unit 101 includes the sequence control unit 601, the register group 602 (storage area), and a memory control unit 605.

The sequence control unit 601 inputs and outputs according to the information set in the register group 602 various control signals 604 for controlling the operation of the CNN processing unit 22. Similarly, the sequence control unit 601 generates a control signal 606 which controls the memory control unit 605. The sequence control unit 601 is configured of the sequencer including a binary counter or a Johnson counter.

Figure 7:
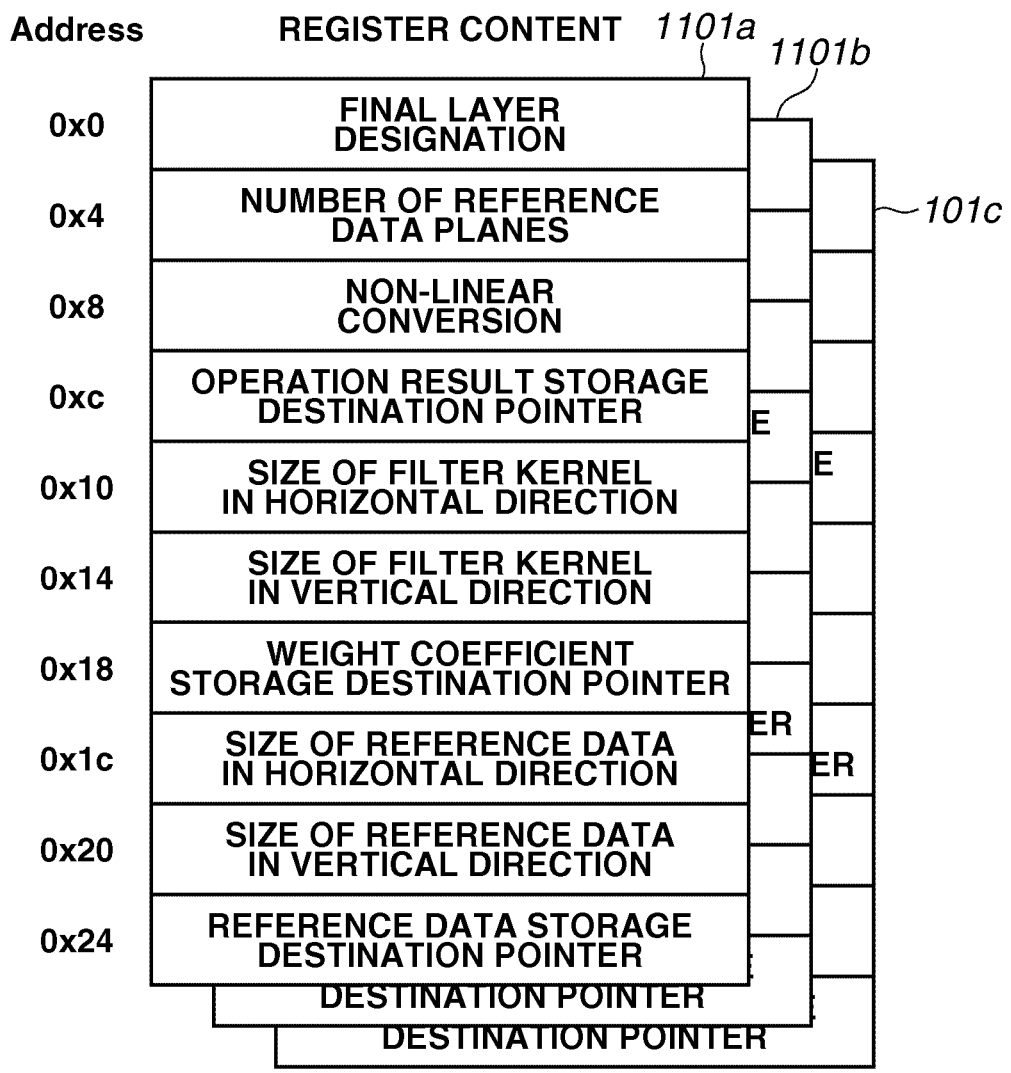
FIG. 7 illustrates an example of information set to a register group.

The register group 602 includes a plurality of register sets, and information for performing one hierarchical process is stored in each register set. The register group 602 is accessible from an external device. FIG. 7 illustrates an example of the information set to the register group 602. Referring to FIG. 7, the three register sets 1101a, 1101b, and 1101c are included in the register group 602, and one register set stores information which is necessary for processing one feature plane. The CPU 27 previously writes predetermined values in the register group 602 via the bridge 24 and the image bus 23. The size of each register inside the register sets 1101a, 1101b, and 1101c is 32 bit length.

A "final layer designation" register illustrated in FIG. 7 designates whether the feature plane corresponding to the register set is the final layer. If the register value is 1, the detection process is ended when the target feature plane is processed.

Figure 13:
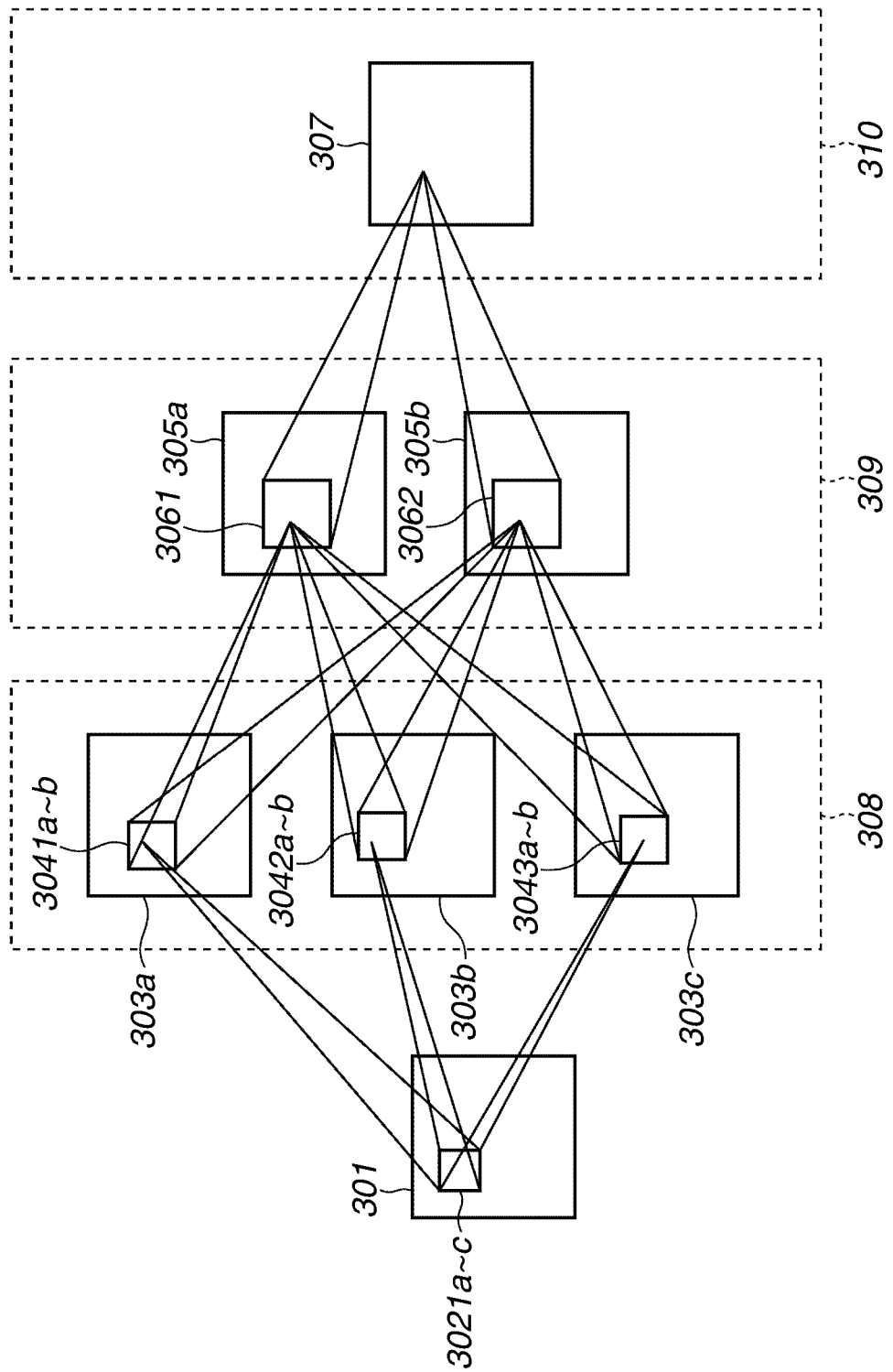
FIG. 13 illustrates a network configuration of an example of the CNN operation.

A "number of reference data planes" register designates the number of the feature planes (data regions) of the previous layer which are connected to the target feature plane. For example, if the feature plane 305a illustrated in FIG. 13 is to be operated, "3" is set to the "number of reference data planes" register.

The "non-linear conversion" register designates whether the non-linear conversion is to be performed. If "1" is set to the register, the non-linear conversion is performed, and if "0" is set to the register, the non-linear conversion is not performed.

An "operation result storage destination pointer" register designates an address indicating a leading pointer in the RAM 100 for storing the operation result of the target feature plane. The operation result is stored in the order of performing raster-scanning with the pointer value as the leading pointer.

A "horizontal size of the filter kernel" register and a "vertical size of the filter kernel" register designate the size of the filter kernel to be used in performing the operation on the feature plane.

A "weight coefficient storage destination" register indicates a storage destination address in the RAM 100 for storing the weight coefficients to be used in performing the operation on the feature plane. For example, the weight coefficient data includes the same number of coefficients as the "number of reference data planes" register. Further the weight coefficient data is stored in the order of performing raster-scanning, starting from the address designated by the "weight coefficient storage destination" register. More specifically, the number of coefficient data which is equal to the product of the values set in the "horizontal size of the filter kernel", the "vertical size of the filter kernel", and the "number of reference data planes" is stored in the RAM 100.

A "vertical size of reference data" register and a "horizontal size of reference data" register each indicate the number of pixels in the horizontal direction and the number of lines in the vertical direction of the reference image data. Further, the reference data is stored in the RAM 100 in the order of performing raster-scanning, starting from the address indicated by the "reference data storage destination pointer" register. In other words, the number of reference data which is equal to the product of the values set in the "horizontal size of reference data", the "vertical size of reference data", and the "number of reference data planes" is stored in the RAM 100.

The above-described plurality of registers is provided for each feature plane. The content of the "reference data storage destination pointer" register of the operation target feature plane may be the content of the "operation result storage destination pointer" register of the feature plane connected in the previous layer. In such a case, the feature plane of the previous layer and the target feature plane are connected. Therefore, a hierarchical connection relation can be arbitrarily constructed for each feature plane by only specifying the register settings (pointer settings).

Figure 8:
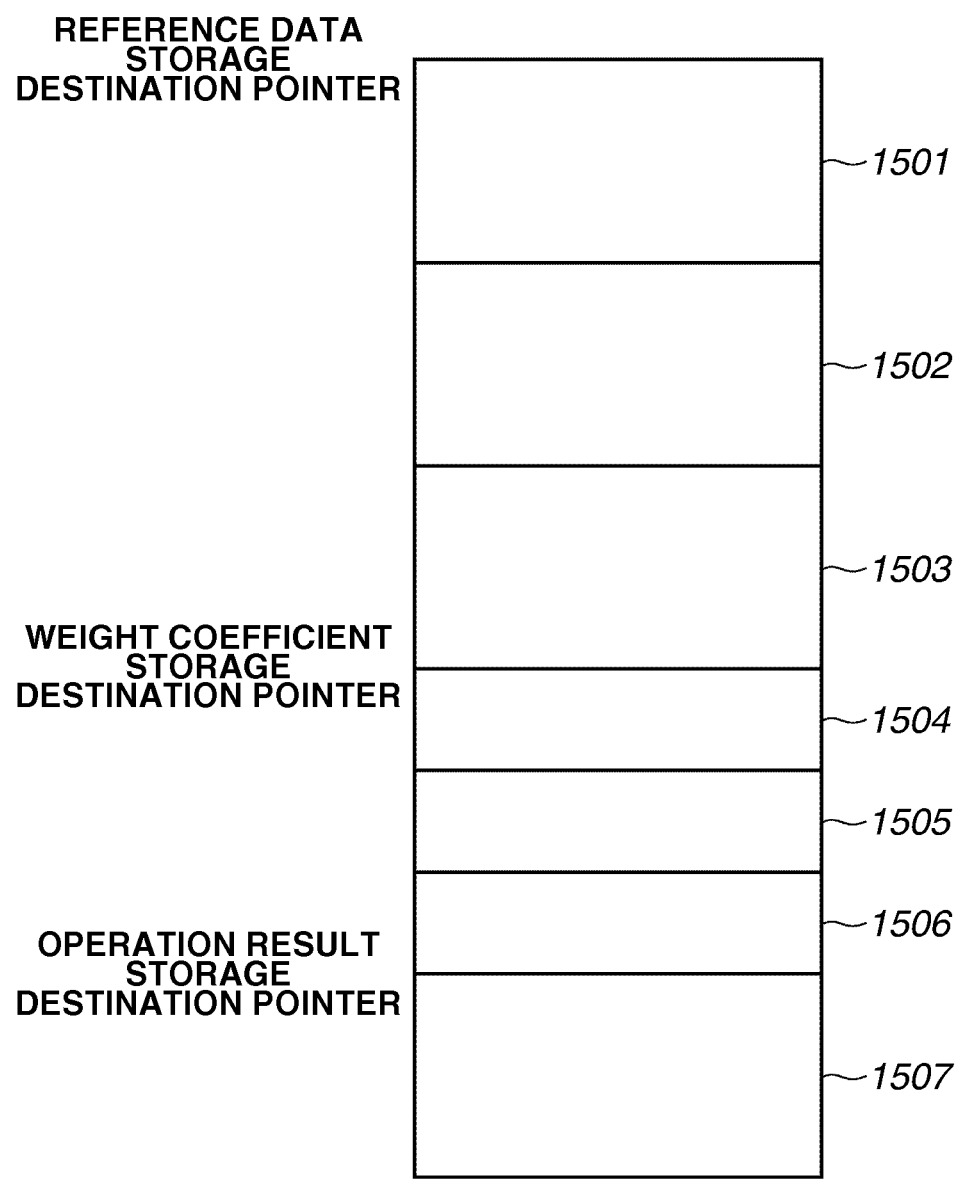
FIG. 8 illustrates an example of a memory map which stores reference data, weight coefficient data, and operation results in a random access memory (RAM).
Figure 10:
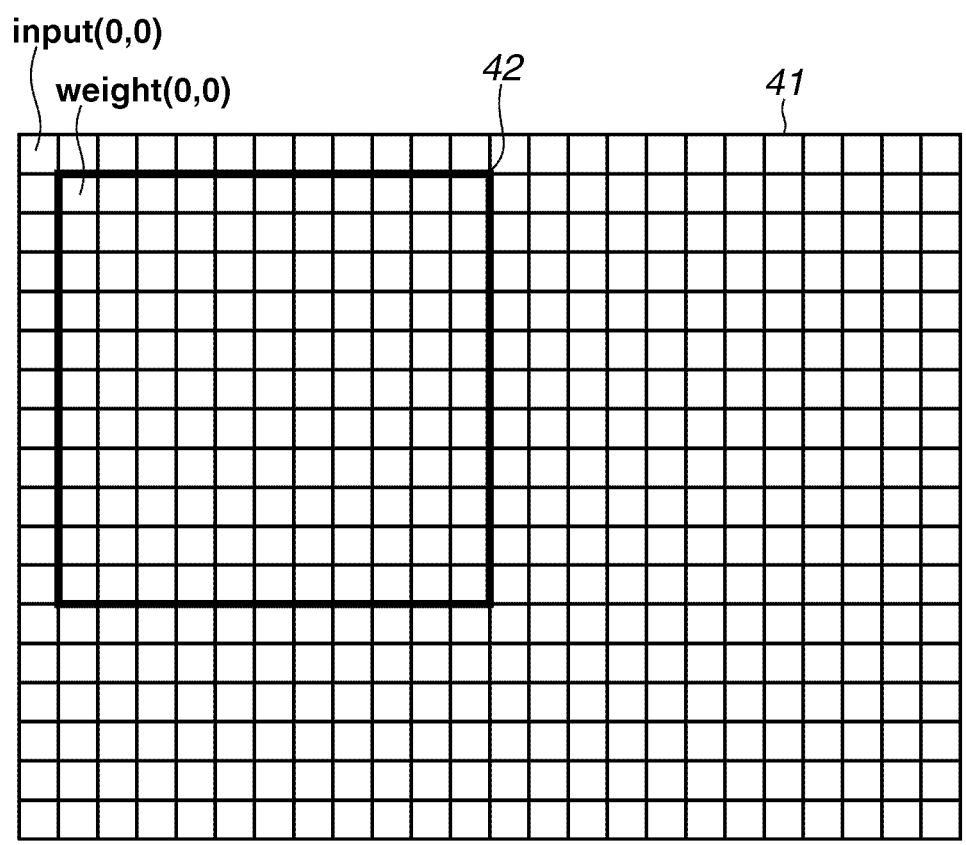
FIG. 10 illustrates the convolution filter.

FIG. 8 illustrates an example of a memory map of the storage data, the weight coefficient data, and the operation result stored in the RAM 100. In the example, there are three connections to the previous layer (i.e., an example in which the feature plane 305a illustrated in FIG. 13 is to be calculated). In such a case, regions 1501, 1502, and 1503 store three reference data, and regions 1504, 1505, and 1506 store filter kernel coefficients that correspond to the reference image. A region 1507 stores the result of the operation performed on the feature plane 305a. Each region stores raster-scanned data.

The control unit 101 can thus access the necessary reference image data and the filter kernel coefficient data using the leading pointer information and information about the size stored in the register group 602. Further, when the control unit 101 performs the operation on the feature plane of the next layer, the control unit 101 designates the region 1507 storing the operation result as the storage region of the reference data (i.e., specifies the setting to the register group 602). As a result, the control unit 101 can perform the operation at high speed without performing unnecessary data transfer.

The sequence control unit 601 performs sequence control related to timing of performing the operation according to the content of the above-described registers, i.e., "horizontal size of filter kernel" register, "vertical size of filter kernel" register, "horizontal size of reference data" register, and "vertical size of reference data" register.

The memory control unit 605 mediates reading and writing of the reference data 607, the weight coefficient data 608, and the operation result data 609 from the RAM 100 and to the RAM 100, according to the control signal 606 generated by the sequence control unit 601. More specifically, the memory control unit 605 controls access to the memory via the image bus 23, reading of the reference data 607 and the weight coefficient data 608, and writing of the operation result data 609. The data widths of the RAM 100 and each bus (data 607, 608, and 609) are all 32 bit.

The operation of the object detection apparatus will be described below. FIG. 9A illustrates a flowchart of the operation of the object detection apparatus according to the first exemplary embodiment.

In step S701, the CPU 27 performs various initialization processes before starting the detection process. For example, the CPU 27 transfers from the ROM 28 to the RAM 100 the weight coefficients which are necessary for the CNN processing unit 22 to perform the operation. Further, the CPU 27 makes various register settings for defining the operation of the CNN processing unit 22, i.e., defining the configuration of the CNN network. More specifically, the CPU 27 sets predetermined values to the plurality of registers in the control unit of the CNN processing unit 22 (refer to FIG. 7). Similarly, the CPU 27 writes into the registers such as the pre-processing unit 25 the values which are necessary for performing the operation.

In step S702, the image input unit 20 converts the signal output from the image sensor into digital data and stores the converted data in the frame buffer (not illustrated) for each frame.

In step S703, the pre-processing unit 25 performs image processing based on a predetermined signal. More specifically, the pre-processing unit 25 extracts luminance data from the image data stored in the frame buffer and performs contrast correction. When extracting the luminance data, the pre-processing unit 25 generates the luminance data from the RGB image data using a general linear conversion. Further, in the contrast correction, the pre-processing unit 25 emphasizes the contrast by applying a well-known contrast correction method. The pre-processing unit 25 then stores in the RAM 100 the luminance data on which the contrast correction has been performed, as the detection image.

When pre-processing is completed for one frame of the image data, the pre-processing unit 25 validates a completion signal (not illustrated). The CNN processing unit 22 then starts the object detection based on the completion signal.

In step S704, the CNN processing unit 22 performs the convolution operation for each feature plane (e.g., feature planes 303a, 303b, 303c illustrated in FIG. 13). After performing the convolution operation on all feature planes (i.e., after completing the operation on the feature plane 307 in FIG. 13), the process proceeds to step S706. In step S706, the CNN processing unit 22 generates an interrupt signal with respect to the CPU 27. More specifically, after the control unit 101 completes the convolution operation on one feature plane in step S704, the process proceeds to step S705. In step S705, the control unit 101 refers to the content of the "final layer designation" register of the register set 1101a. If the content does not indicate the final layer (NO in step S705), the process returns to step S704. The control unit 101 then starts performing the similar convolution operation on the next feature plane according to the content of the register set existing in the next address of the register group 602.

On the other hand, if the content of the register indicates the final layer (YES in step S705), the process proceeds to step S706. In step S706, the control unit 101 generates the end notification interrupt signal to the CPU 27 after completing the predetermined convolution operation. In step S707, if the object detection apparatus is to detect a predetermined object from a moving image, the CPU 27 continuously performs the above-described process in for each frame image. The interrupt process will be described in detail below with reference to FIG. 9B.

Figure 14:
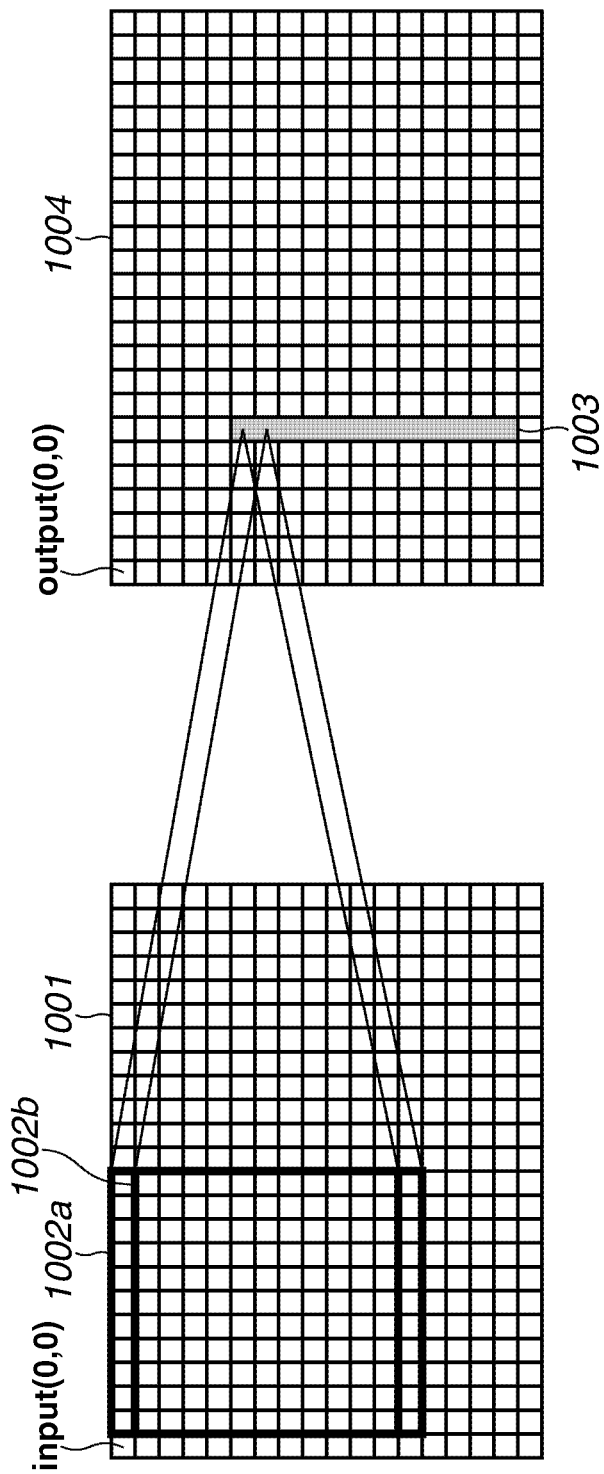
FIG. 14 illustrates a specific example of parallel processing.

FIG. 14 illustrates a specific example of parallel processing (convolution operation). Referring to FIG. 14, a reference data plane 1001 and a target feature data plane 1004 are illustrated in raster-scanned data coordinates. Each block (smallest square illustrated) in the reference data plane 1001 indicates an operation result (input (x, y), x: position in the horizontal direction, y: position in the vertical direction) of the previous layer stored in the RAM 100 in the order of performing raster-scanning. Each block in the target feature data plane 1004 indicates a raster-scanned operation result (output (x, y), x: position in the horizontal direction, y: position in the vertical direction). Further, each of reference data ranges 1002a and 1002b are reference data ranges which are necessary for performing the filter operations in calculating the feature plane data at output (5, 5) and output (5,6) positions.

In the example, the kernel size of the filter is "11" in the horizontal direction and "12" in the vertical direction. A region 1003 is a region of the feature plane data in which the filter operations are concurrently performed. For example, if the degree of parallelism is 12, the operation is concurrently performed on the data of positions of output (5, y): y=5 to 16 in the feature plane. In the present exemplary embodiment, the filter operation is thus performed by scanning the region to be parallel-processed (i.e., region 1003) by 1 pixel in the horizontal direction and 12 lines in the vertical direction. As a result, high-speed filter operation is performed on a two-dimensional data.

Figure 11:
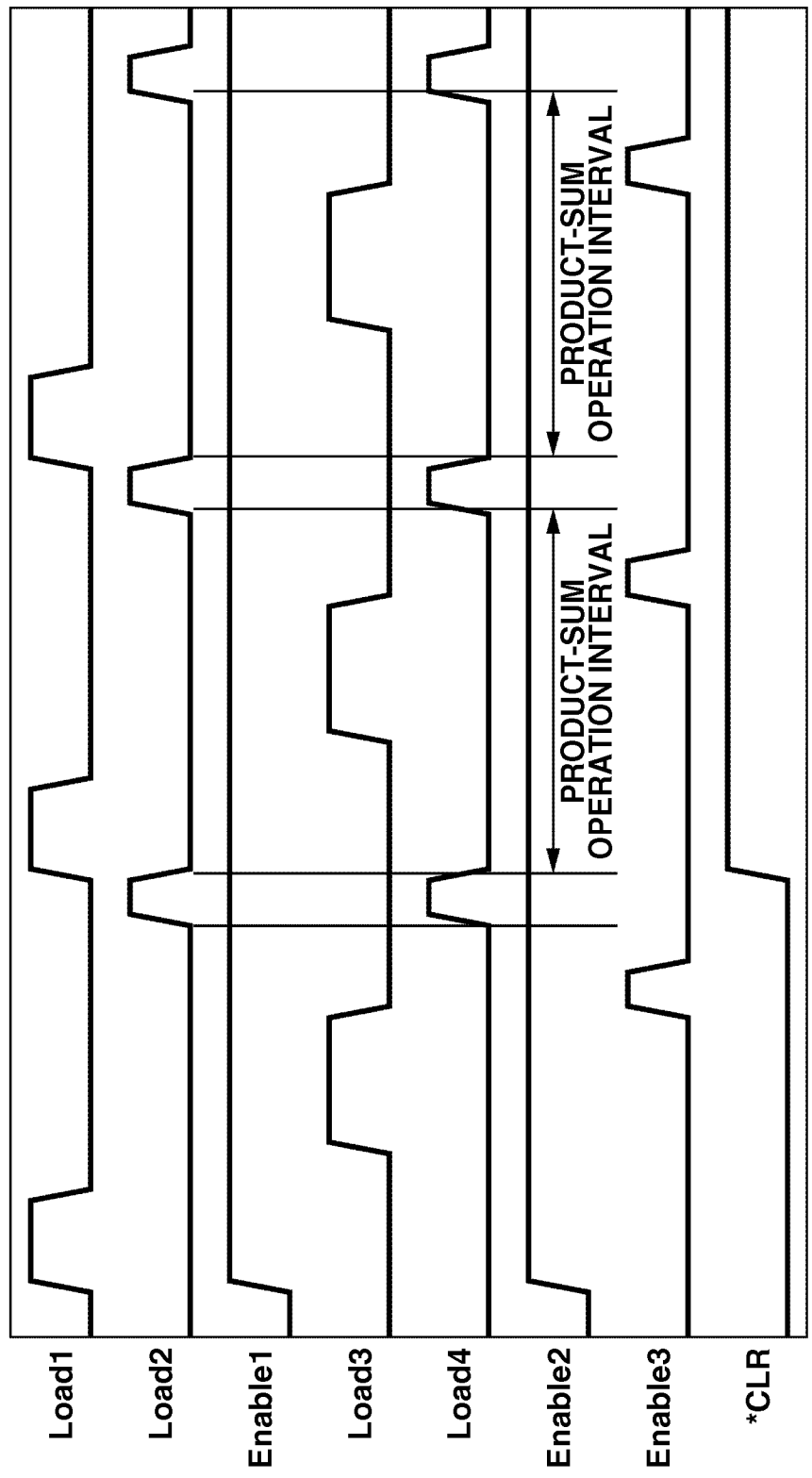
FIG. 11 illustrates a time chart of the convolution operation performed according to the first exemplary embodiment of the present invention.

FIG. 11 illustrates a time chart of the convolution operation according to the first exemplary embodiment. Referring to FIG. 11, a portion of the convolution operation on one feature plane (performed in step S704) is illustrated, and all signals are synchronized based on the clock signal (not illustrated).

Load1 signal is an enable signal which loads the weight data onto the storage unit 102. While the Load1 signal is valid (i.e., the signal level is 1), the control unit 101 reads out one column of the weight data from the RAM 100 and writes the readout data into the storage unit 102. The size of one column of the filter kernel is stored in the register group 602. Further, the control unit 101 determines the address of the data to be read out based on the address pointer information of the weight coefficient, the weight coefficient size, and the number of data planes to be designated in the register group 602. The data width of the RAM 100 is 32 bit and the data width of the weight coefficient is 8 bit. If the control unit 101 is to write into the storage unit 102 12 weight coefficients in the column direction (as illustrated in the example of FIG. 14), the control unit 101 completes the loading process in 3 clocks. Hereinafter, a cycle of reading out from and writing into the RAM 100 is completed in 1 clock.

Upon loading the weight coefficients, the control unit 101 validates the Load3 signal to start loading the reference data. Similar to the Load1 signal, the Load 3 signal is also valid when the signal level is 1. The control unit 101 then retrieves the reference data from the RAM 100 at the same time as validating the Load3 signal and sets the reference data to the storage unit 103. The number of data to be set is determined by the size of the filter kernel stored in the register group 602 and the degree of parallelism. Further, the control unit 101 determines the address of the data to be read out from the RAM 100 based on the address pointer information of the reference data, the size of the reference data, and the number of reference data planes which are designated by the register group 602. Since the significant digits of the reference data is 8 bit, if the control unit 101 is to write 23 reference data into the storage unit 103, the control unit completes the writing sequence in 6 cycles. In the example illustrated in FIG. 14, the size of the filter kernel in the horizontal direction is 12 and the degree of parallelism of the operation is 12. It is thus necessary to load the data whose degree of parallelism is 23 (i.e., 12+12−1=23).

*CLR signal is a signal for initializing the cumulative adder 108. If the *CLR signal is 0, the register 902 of the cumulative adder 108 is initialized to 0. The control unit 101 sets 0 to the *CLR signal before starting the convolution operation at a position on a new feature plane.

Load2 signal is a signal which instructs the initialization of the shift register 104. If the Load 2 signal is 1 and the Enable1 signal is valid (signal level is 1), the plurality of the weight coefficient data stored in the storage unit 102 is collectively loaded to the shift register 104. The Enable 1 signal is a signal for controlling the data transition to the shift register and is constantly set to 1 while in operation as illustrated in FIG. 11. Therefore, if the Load2 signal is 1, the output of the storage unit 102 is latched according to the clock signal, and if the Load2 signal is 0, the shift operation is continued according to the clock signal. The sequence control unit 601 of the control unit 101 validates the Load2 signal after counting the number of clocks that corresponds to the size of the filter kernel in the column direction. The sequence control unit 601 then collectively loads the reference data stored in the storage unit 102 to the shift register 104 concurrently with stopping the shift operation. In other words, the sequence control unit 601 collectively loads the necessary reference data in the horizontal direction of the filter kernel and shifts out the loaded reference data in response to the operation clock.

Load4 signal is a signal which instructs initialization of the shift register 105. If the Load4 signal is 1 and the Enable2 signal is valid (signal level is 1), the plurality of the weight coefficient data stored in the storage unit 103 is collectively loaded to the shift register 105. The Enable2 signal is a signal for controlling the data transition to the shift register and is constantly set to 1 while in operation as illustrated in FIG. 11. Therefore, if the Load4 signal is 1, the output from the storage unit 103 is latched according to the clock signal, and if the Load4 signal is 0, the shift process is continued according to the clock signal. The sequence control unit 601 of the control unit 101 validates the Load4 signal after counting the number of clocks that corresponds to the size of the filter kernel in the column direction. The sequence control unit 601 then collectively loads the reference data stored in the storage unit 103 concurrently with stopping the shift operation. In other words, the sequence control unit 601 collectively loads the necessary reference data by one column unit of the filter kernel and shifts the loaded reference data in response to the operation clock. The control unit 101 thus controls the Load4 signal at the same timing as the Load2 signal.

The cumulative adder 108 continues to perform the product-sum operation in synchronization with the clock. The cumulative adder 108 thus concurrently executes the product-sum operation corresponding to the filter kernel size on a plurality of points on the feature plane which is calculated according to the shift operation of the shift registers 104 and 105. More specifically, the product-sum operation for one column of the filter kernel is performed during the shift operation of the shift registers 104 and 105 (i.e., the product-sum operation period illustrated in FIG. 11). The cumulative adder 108 repeats such operation for each column in the horizontal direction by changing the weight coefficient and the reference data.

The two-dimensional convolution operation result corresponding to the degree of parallelism is thus generated. Further, the control unit 101 controls each signal according to the kernel size and the degree of parallelism and performs the product-sum operation in parallel with supplying from the RAM 100 the data (the weight coefficient data and the reference data) which is necessary for executing the product-sum operation.

Load5 signal is a signal for loading in parallel the results of the cumulative adders to the shift register 106. When the product-sum operations to be parallel-processed on the target feature plane are completed, the control unit 101 outputs 1 to the Load5 signal and the Enable3 signal (not illustrated). If the Load5 signal is 1 and the Enable3 signal is 1, the shift register 106 collectively loads the output of the cumulative adder 108. At the timing illustrated in FIG. 11, it is assumed that the calculated convolution operation result is latched by the shift register 106.

If the loading of data to the storage units 102 and 103 is completed during the shift operation of the shift registers 104 and 105, the control unit 101 validates the Enable3 signal and shifts out the operation results stored in the shift register 106. In other words, the control unit 101 outputs the signal OUTn (the final layer output of the shift register 106) towards the non-linear conversion unit 109. The non-linear conversion unit 109 then converts the shifted out operation result. The control unit 101 stores the converted result in the predetermined address of the RAM 100 according to the operation result storage destination pointer and the size of the reference data indicated in the register group 602.

As described above, the control unit 101 mediates accessing of the RAM 100 by the storage units 102 and 103 and the non-linear conversion unit 109 and thus pipelines accessing of the RAM 100. In the example illustrated in FIG. 14, a "number of clocks necessary for the product-sum operation for each column (12)" is greater than "the number of clocks for loading the weight coefficient (3)+the number of clocks for loading the reference data (6)+the number of clocks for storing the result data (1)".

The time necessary for accessing the memory is thus concealed by the product-sum operation time. Since the access frequency of the non-linear conversion unit 109 to the RAM 100 is lower than those of the storage units 102 and 103, the non-linear conversion unit 109 operates with the lowest priority. That is, the non-linear conversion unit 109 accesses the RAM 100 during the time slot between the storage units 102 and 103 accessing the RAM 100.

Further, in the present exemplary embodiment, the reference data and the weight coefficients are read out in parallel with writing the operation result in the RAM 100 during the product-sum operation period. As a result, the number of convolution operations equivalent to the degree of parallelism is completed during the number of clocks equivalent to "the product-sum operation time (horizontal size of the filter kernel×vertical size of the filter kernel)+the load time of the shift register (horizontal size of the filter kernel)×number of connected feature planes in the previous layer".

The access to the RAM 100 may not be completely pipelined during the product-sum period depending on the relation between the degree of parallelism and the filter kernel, such as when the filter kernel is small. In such a case, it is desirable for the control unit 101 to give priority to completing the access to the RAM 100 and to delay starting of the product-sum operation by controlling the Enable1 signal, the Enable2 signal, the Enable3 signal, and the Latch Enable signal of the cumulative adder. More specifically, it is desirable to load the data to the storage units 102 and 103 and save the data of the non-linear conversion unit 109.

The interrupt process performed when the convolution operation is to be ended will be described below. FIG. 9B illustrates the flowchart of the operation of the interrupt process.

In the interrupt process, the CPU 27 receives the end notification interrupt from the control unit 101. In step S708, the CPU 27 activates the DMAC 26 and transfers the final feature plane data stored in the RAM 100 to the RAM 29 on the CPU bus 30.

In step S709, the CPU 27 acquires from the final layer detection result stored in the RAM 29 information such as the position and the size of the predetermined object to be detected. More specifically, the CPU 27 binarizes the final detection result and extracts the object position and size by performing processes such as labeling.

The series of processes thus ends.

According to the present exemplary embodiment, the operation and the memory access can be pipelined by the size of the filter kernel in the same direction as the parallelism, using a small-scale circuit (e.g., register size). The hierarchical convolution operation can thus be performed at high speed. Further, since the circuit configuration lays out the reference data and the operation result data on the same memory space, the complex hierarchical convolution operation can be flexibly performed by only specifying the register settings.

As a result, the hierarchical convolution operation can be realized at low cost and high speed. Further, the convolution operation which includes various hierarchical connections can be performed at high speed using the same circuit.

The second exemplary embodiment will be described below. In the second exemplary embodiment, the configuration and control timing of the storage unit 102 and the shift register 104 are different from those of the first exemplary embodiment, and the other configurations are the same as the first exemplary embodiment. In the first exemplary embodiment, the shift register 104 loads the data from the storage unit 102 for each column of the convolution kernel. More specifically, the control unit 101 activates the Load2 signal and the Load4 signal at the same timing. In contrast, in the second exemplary embodiment, the storage unit 102 and the shift register 104 are each configured by registers and shift registers whose lengths are longer than or equal to the number of the convolution kernel coefficients.

Figure 12:
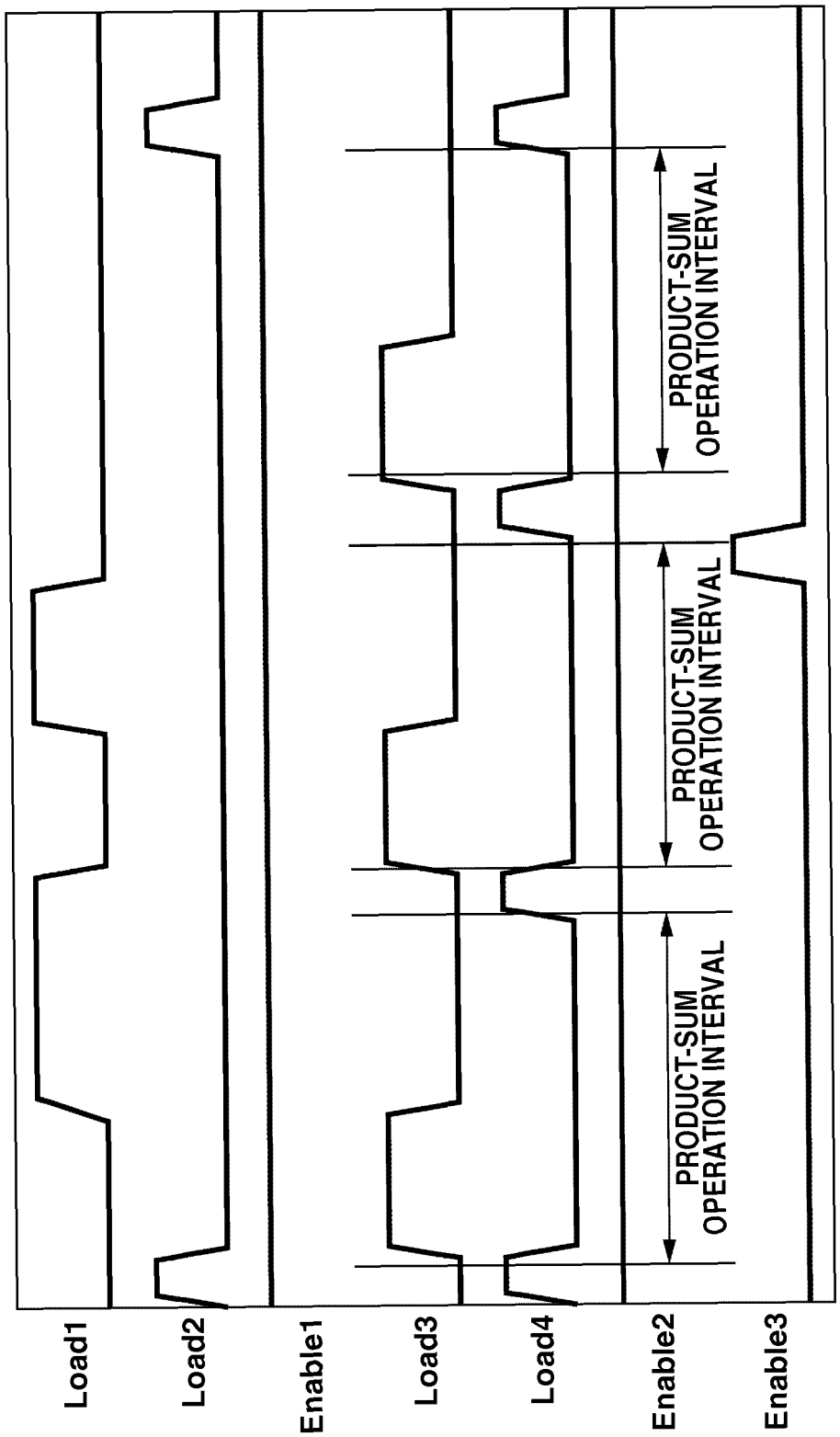
FIG. 12 illustrates a time chart of the convolution operation performed according to a second exemplary embodiment of the present invention.

FIG. 12 illustrates a time chart of the convolution operation performed according to the second exemplary embodiment. Referring to FIG. 12, the filter kernel size is 3 by 3. Each signal illustrated in FIG. 12 is the same as those illustrated in FIG. 11, and the time chart illustrated in FIG. 12 is related to the data access to the RAM 100 when performing the product-sum operation.

When the operation is to be started on a new convolution kernel, the control unit 101 validates the Load2 signal and collectively loads all of the weight coefficients stored in the storage unit 102 to the shift register 104.

While performing the product-sum operation, the control unit 101 validates the Load3 signal and loads to the RAM 100 or the storage unit 103 the reference data for performing the convolution operation in the next column. When the reference data necessary for processing one column is completely loaded, the control unit 101 validates the Load1 signal and transfers the weight coefficients of the next convolution kernel from the RAM 100 to the storage unit 102. After completing the convolution operation for the subsequent column of the filter kernel, the control unit 101 validates the Load4 signal and collectively loads to the shift register 105 the reference data of the next column stored in the storage unit 103.

After loading the reference data, the control unit 101 validates the Load3 signal and transfers the reference data of the next column from the RAM 100 to the storage unit 103. The control unit 101 also invalidates the Load1 signal. After transferring the reference data, the control unit 101 again validates the Load1 signal and restarts transferring the filter kernel coefficients from the RAM 100 to the storage unit 102. After completing the transfer of all coefficients of the subsequent filter kernel, the control unit 101 validates the Enable3 signal and stores the non-linear conversion results in the RAM 100.

In the present exemplary embodiment, priority is given to loading of the reference data, and the coefficients of the next kernel are loaded in the storage unit 102 in between the loading of the reference data.

As described above, in the second exemplary embodiment, the weight coefficient data is stored in the storage unit 102 and the shift register 104 for each filter kernel. The load frequency from the storage unit 102 to the shift register 104 thus decreases as compared to the first exemplary embodiment. In the example illustrated in FIG. 12, the load frequency is reduced by two times as compared to the example illustrated in FIG. 11. As a result, the access frequency to the RAM 100 for loading the data to the storage unit 102 can be increased by the reduced number of the load frequency. Therefore, the access frequency to the RAM 100 during the product-sum period by the storage unit 103 and the non-linear conversion unit 109 can be increased. Further, even in a case where the start of the product-sum operation is to be delayed, such as the smallness of the filter kernel size, the delayed number of cycles can be reduced.

In the above-described exemplary embodiments, the degree of parallelism of the product-sum operations is set to 12. However, the present invention is not limited to the above and can be applied to any circuit of an arbitrary degree of parallelism set according to the circuit size and the required efficiency.

Further, according to the above-described exemplary embodiments, the storage units 102 and 103 are configured by the registers. However, the present invention is not limited to such a configuration, and high-speed memories can be employed.

Furthermore, the direction of performing parallel processing is not limited to the column direction as illustrated in FIG. 14, and the plurality of feature plane data continuing in the row direction can be processed in parallel. In such a case, the weight coefficients of one row of the filter kernel are loaded on the storage unit 102, and a number of reference data equivalent to "degree of parallelism+size of filter kernel in row direction−1" which continue in the row direction are loaded in the storage unit 103.

Moreover, the initial values are loaded on the shift registers 104 and 105 by the size of the filter kernel in the row direction, and the shift registers 104 and 105 perform the number of shift operations equal to the size in the row direction. By repeating the above-described processes for the size of the filter kernel in the column direction, the feature plane data can be calculated similar to the first exemplary embodiment.

Further, in the above-described exemplary embodiments, the register group 602 is embedded in the control unit 101. However, a configuration that corresponds to the register group 602 can be disposed on an external memory. For example, the predetermined addresses on the RAM 100 can be mapped on a common address space as the register group of the control unit 101. In such a case, since it becomes unnecessary to include the register set in the CNN processing unit 22, the circuit size of the CNN processing unit 22 can be reduced. Furthermore, since the capacity of the register set becomes limitless, a complex hierarchical network with a large number of feature planes can be structured with the same hardware.

Moreover, the minimum resister sets can be embedded along with using an external memory according to the selection signal as a substitute of the register group. As a result, the network structured with only the embedded resister sets can perform high-speed processing, and a complex network can also be structured with the same circuit.

Further, in the above-described exemplary embodiments, an optical image input unit including the image sensor is included in the image input unit 20. However, the process can be performed on the image data acquired from a network apparatus or a recording apparatus such as a hard disk.

Furthermore, in the above-described exemplary embodiments, the operations are performed in combination with the CPU 27. However, the present invention can be applied to a system configured by only dedicated hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-309970 filed Dec. 4, 2008, which is hereby incorporated by reference herein in its entirety.

The invention claimed is:

1. A convolution operation circuit comprising:
a plurality of multipliers;
a first shift register configured to provide data to a first input of the plurality of multipliers;
a first storage unit configured to store a plurality of data to be supplied to the first shift register;
a second shift register configured to provide data to a second input of the plurality of multipliers;
a second storage unit configured to store a plurality of data to be supplied to the second shift register;
a plurality of cumulative adders configured to accumulate output from the plurality of multipliers;
a third storage unit configured to latch output from the plurality of cumulative adders at predetermined timing;
a fourth storage unit configured to store data to be stored in the first storage unit and the second storage unit and data output from the third storage unit; and
a control unit configured to control operations of the first storage unit, the second storage unit, the third storage unit, the fourth storage unit, the first shift register, the second register, and the cumulative adder,
wherein the control unit sets a plurality of data stored in the first storage unit to the first shift register at predetermined timing, sets a plurality of data stored in the second storage unit to the second shift register at predetermined timing, causes the first shift register and the second shift register to perform shift operations in synchronization with an operation of the cumulative adder, and transfers during the shift operation data stored in the fourth storage unit to at least one of the first storage unit and the second storage unit.

2. The convolution operation circuit according to claim 1, wherein the third storage unit is a shift register including a number of registers which is greater than or equal to a number of the plurality of multipliers.

3. The convolution operation circuit according to claim 1, further comprising a non-linear conversion unit configured to perform non-linear conversion on an output from the third storage unit.

4. The convolution operation circuit according to claim 3, wherein the control unit stores in a predetermined region in the fourth storage unit during the shift operation an operation result stored in the third storage unit or a result of non-linear conversion performed by the non-linear conversion unit.

5. The convolution operation circuit according to claim 1, wherein a register length of the first shift register and a storage capacity of the first storage unit is greater than or equal to a value acquired by subtracting 1 from a sum of a number of the multipliers and a size of a column or a row of a two-dimensional convolution kernel, and
wherein the predetermined timing at which data is set to the first shift register is timing at which a process of performing a convolution operation in a column direction or a row direction is started or ended.

6. The convolution operation circuit according to claim 1, wherein a register length of the second shift register and a storage capacity of the second storage unit is greater than or equal to a size of a column or a row of a two-dimensional convolution kernel, and
wherein predetermined timing at which data is set to the second shift register is timing at which a process of performing a convolution operation in a column direction or a row direction is started or ended.

7. The convolution operation circuit according to claim 1, wherein a register length of the second shift register and a storage capacity of the second storage unit is greater than or equal to a number of coefficients in a two-dimensional convolution kernel, and wherein predetermined timing at which data is set to the second shift register is timing at which a process of performing one convolution operation is started or ended.

8. An object recognition apparatus including a convolution operation circuit according to claim 1.

9. A hierarchical convolution operation circuit comprising:
a convolution operation unit including:
a multiplier;
a first storage unit configured to provide data to a first input of the multiplier;
a second storage unit configured to provide data to a second input of the multiplier;
a cumulative adder configured to accumulate output from the multiplier;
a third storage unit configured to latch output from the cumulative adder;
a fourth storage unit configured to store data to be supplied to the first storage unit and the second storage unit and data output from the third storage unit; and
a control unit configured to control operations performed by the fourth storage unit and the convolution operation unit, wherein the control unit maps the fourth storage unit in a common address space, controls a reading address and a writing address in the fourth storage unit and performs data transfer from the fourth storage unit to the first storage unit and the second storage unit and from the third storage unit to the fourth storage unit, and causes the convolution operation unit to perform a convolution operation on data to be processed, stored in the fourth storage unit and again perform convolution operation on a result of the convolution operation.

10. The hierarchical convolution operation circuit according to claim 9, wherein the control unit includes a storage region which is accessible from outside and determines a hierarchical connection relation according to a content of the storage region.

11. The hierarchical convolution operation circuit according to claim 10, wherein the control unit determines an address of the storage region according to a content of the storage region which is accessible from outside.

12. The hierarchical convolution operation circuit according to claim 10, wherein the control unit includes information for determining a hierarchical connection according to a content of the storage region which is accessible from outside for each convolution operation to be performed on all data regions in a previous layer to be connected.

13. The hierarchical convolution operation circuit according to claim 10, wherein the control unit determines a read address of the fourth storage unit according to a content of the storage region which is accessible from outside.

14. The hierarchical convolution operation circuit according to claim 10, wherein the control unit determines a write address of the fourth storage unit according to a content of the storage region which is accessible from outside.

15. The hierarchical convolution operation circuit according to claim 10, wherein the storage region which is accessible from outside includes information about a pointer of data in a previous layer to be connected.

16. The hierarchical convolution operation circuit according to claim 10, wherein the storage region which is accessible from outside includes information about a pointer of storage destination of feature data to be processed.

17. The hierarchical convolution operation circuit according to claim 10, wherein the storage region which is accessible from outside includes information for defining a number of previous layers to be connected.

18. The hierarchical convolution operation circuit according to claim 10, wherein the storage region which is accessible from outside includes information for defining whether a unit of convolution operations to be performed on all data regions in a previous layer to be connected is a final process.

19. The hierarchical convolution operation circuit according to claim 10, wherein the storage region which is accessible from outside includes information about a size of weight coefficients.

20. The hierarchical convolution operation circuit according to claim 10, wherein the storage region which is accessible from outside includes information about a pointer of weight coefficient data.

21. The hierarchical convolution operation circuit according to claim 10, wherein the control unit determines whether to perform non-linear conversion according to a content of the storage region which is accessible from outside.

22. An object recognition apparatus including a convolution operation circuit according to claim 9.

* * * * *